US009881318B1

(12) United States Patent
Krishnamoorthy et al.

(10) Patent No.: US 9,881,318 B1
(45) Date of Patent: Jan. 30, 2018

(54) ATTRIBUTING WEB-BASED USER ACTIONS TO MULTIVARIATE TEST PARAMETERS ASSOCIATED WITH PUBLISHER CONTENT

(71) Applicant: Amazon Technologies, Inc., Reno, NV (US)

(72) Inventors: Prasanna Krishnamoorthy, Karnataka (IN); Matthew Hamilton Battles, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 984 days.

(21) Appl. No.: 14/027,935

(22) Filed: Sep. 16, 2013

(51) Int. Cl.
*G06Q 30/00* (2012.01)
*G06Q 30/02* (2012.01)

(52) U.S. Cl.
CPC ................ *G06Q 30/0246* (2013.01)

(58) Field of Classification Search
CPC .................................................. G06Q 30/0244
See application file for complete search history.

(56) References Cited

U.S. PATENT DOCUMENTS

| | | | | |
|---|---|---|---|---|
| 8,180,376 B1 * | 5/2012 | Merritt | ................. | H04W 24/10 455/456.2 |
| 8,775,603 B2 * | 7/2014 | Hansen | ................. | G06Q 30/02 705/4 |
| 8,782,200 B2 * | 7/2014 | Hansen | ............. | G06F 17/30899 709/203 |
| 2008/0201206 A1 * | 8/2008 | Pokorney | .......... | G06F 17/30867 705/7.29 |
| 2008/0262913 A1 * | 10/2008 | Reitz | .................. | G06Q 30/0236 705/14.36 |
| 2009/0112609 A1 * | 4/2009 | Dangaltchev | .......... | G06Q 30/02 705/14.1 |
| 2009/0282343 A1 * | 11/2009 | Catlin | ............... | G06F 17/30867 715/738 |
| 2011/0040617 A1 * | 2/2011 | Moonka | ................. | G06Q 30/02 705/14.46 |
| 2012/0310728 A1 * | 12/2012 | Kagan | .................... | G06Q 30/02 705/14.43 |

* cited by examiner

*Primary Examiner* — Matthew T Sittner
(74) *Attorney, Agent, or Firm* — Eversheds Sutherland (US) LLP

(57) ABSTRACT

Certain embodiments herein relate to attributing or associating a user's actions with respect to web page content to the multivariate test parameters. For example, a user's purchase of a product after clicking on an ad in the web page content may be attributed to multivariate test parameters corresponding to the placement of the ad, the size of the ad image, whether a border is placed around the ad, any number of attributes associated with the ad, the content in which the ad is placed, etc. In certain embodiments, a user's actions may occur at a device that is separate from the publisher device. Techniques described herein may attribute or associate such actions with a publisher's web page content such that publishers may be made aware of the effectiveness of the placement, layout, orientation, etc., of their web page content based on how users reacted to such attributes.

17 Claims, 8 Drawing Sheets

ATTRIBUTING WEB-BASED USER ACTIONS TO MULTIVARIATE TEST PARAMETERS ASSOCIATED WITH PUBLISHER CONTENT

BACKGROUND

Publishers of web-based content may determine optimal configurations for presenting content on their web pages, for example, using multivariate testing techniques, to encourage certain user actions. Measuring such user actions, however, may be problematic when the actions are dissociated from the publisher of the content. For example, a publisher may not be aware of which configuration of its web page led to a user completing an online survey after clicking on an advertisement ("ad") on the web page associated with a third party advertiser. Publishers, therefore, may be unable to attribute certain user actions to their web page configurations, and therefore, may be unable to measure the effectiveness of their content presentations.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, attributing web-based user actions to multivariate test parameters associated with web page content. A publisher of web page content may employ a multivariate test to determine which components or attributes of the web page content best meet a determined goal or objective. For example, a publisher may desire to know the effect on a user's behavior of placing an ad in the web page content in the upper-left corner using a small headline description versus placing the same ad in the upper-right corner using a large headline description. Any number of parameters or variables associated with attributes of the web page, such as the placement of the content, the layout of the web page, etc., (referred to herein as multivariate test parameters) may be used in a multivariate test of web page content.

Certain embodiments herein relate to attributing or associating a user's actions with respect to web page content to multivariate test parameters. For example, a user's purchase of a product after clicking on an ad in the web page content may be attributed to multivariate test parameters corresponding to the placement of the ad, the size of the ad image, whether a border is placed around the ad, any number of attributes associated with the ad, the content in which the ad is placed, etc. In certain embodiments, a user's actions may occur at a device that is separate from the publisher device. Techniques described herein may attribute or associate such actions with a publisher's web page content such that publishers may be made aware of the effectiveness of the placement, layout, orientation, etc., of their web page content based on how users reacted to such attributes.

Figure 1:
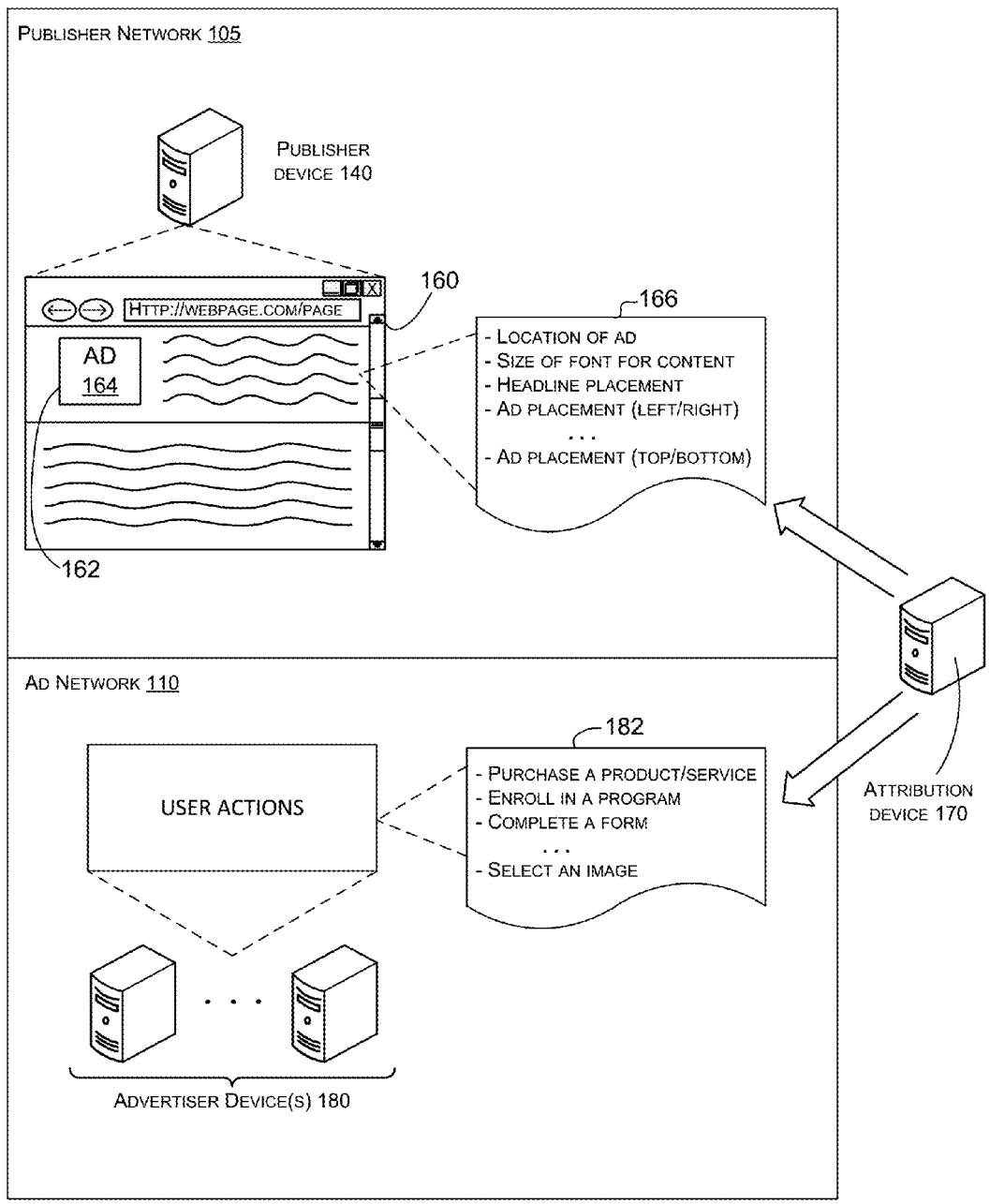
FIG. 1 illustrates an example schematic diagram for attributing web-based user actions to multivariate test parameters associated with content on a web page, according to an embodiment of the disclosure.

An example of devices that may implement or facilitate such attribution is illustrated in FIG. 1. FIG. 1 depicts an example schematic diagram for attributing web-based user actions to multivariate test parameters associated with content on a web page, according to an embodiment of the disclosure. In certain embodiments herein, user actions that occur in an ad network 110 may be attributed to multivariate test parameters in a publisher network 105. As shown in FIG. 1, a publisher device 140 may generate content for presentation via a web page 160 by a user device (not shown). The content may include various information, such as text, video, images, data, audio, multimedia, etc. The content may further include an ad unit 162 into which one or more ads 164 may be presented.

In generating web page content, the publisher device 140 may embed a command or message in Hypertext Markup Language (HTML), JavaScript, or other code for rendering web page content. The command or message may include multivariate test parameters (or an indication of a multivariate test that includes certain multivariate test parameters), an identification of a publisher of the web page content, information associated with a user who requested the web page content via a user device, other information that may facilitate the selection of a particular ad for the user, etc. The command or message, when executed by the user device, may cause the user device to contact another device. For example, the command may cause the user device to request an ad 164 for display to the user. Other examples exist in other embodiments.

Returning to the content on the web page 160, multivariate testing may be performed on such content. As used herein, multivariate testing may refer to the process of testing multiple components of a web page or website. Multivariate testing may be utilized to determine which variation or presentation of content meets the defined goals of a website better than other variations. Numerous components or attributes of a web page may be varied to make such a determination. Such components or attributes may be referred to herein as multivariate test parameters. FIG. 1 illustrates example multivariate test parameters 166, such as the font size of text on the web page 160; the placement or position of a headline on the web page 160; and the location of an ad, such as whether the ad is above or below the fold, the placement of the ad from left-to-right and/or top-to-bottom, etc. Any number of multivariate test parameters 166 associated with any number of components or attributes for a web page may exist in other examples.

The ad network 110 may include one or more advertiser devices 180 or other devices related to implementing or facilitating the presentation of ads, the purchase of products or services associated with the ads, bidding for opportunities to present an ad on a web page, or various other advertising related functions. In one embodiment, an advertiser device 180 may be a first party advertiser, which may be an entity that presents an ad in the ad unit 162 on its own behalf or on behalf of one or more other entities. In other embodiments, the advertiser device 180 may be a third party advertiser that may rely on a first party advertiser to present ads on its behalf, including submitting bids for ad space. The ad network 110 may also include an ad server (not shown), which may facilitate the selection and distribution of ads for presentation in the ad unit 162. Example functionality of each of these devices will be provided in detail below.

An attribution device 170 may attribute user actions 182 to multivariate testing variables, among other functions. In so doing, the attribution device 170 may receive information associated with a multivariate test, link the information to a user's actions, and send the results of the attribution to the publisher device 140, in one embodiment. In this way, the attribution device 170 may serve as a bridge or link between the publisher network 105 and the ad network 110 such that a device in the publisher network 105 (for example, the publisher device 140) may identify which configurations of the web page 160 are optimal based on a user's behavior with respect to the configurations.

The attribution device 170 may be various types of devices. In one configuration, the attribution device 170 may be an ad server, which may serve one or more ads 164 for presentation in the ad unit 162. To facilitate serving the ads 164, the ad server may also determine one or more of the ads 164 for presentation in the ad unit 162. In another configuration, the attribution device 170 may be an advertiser device 180. In yet another embodiment, the attribution device 170 may be a user device. Attribution of user actions to multivariate test parameters as performed by each of these devices will be described below.

The above configuration in FIG. 1 is for purposes of illustration and is not meant to be limiting. Various other configurations may exist in other examples, at least some of which may include a different number and/or type of devices, a different arrangement of content on a publisher web page, a different number and/or type of multivariate test parameters, etc.

Figure 2:
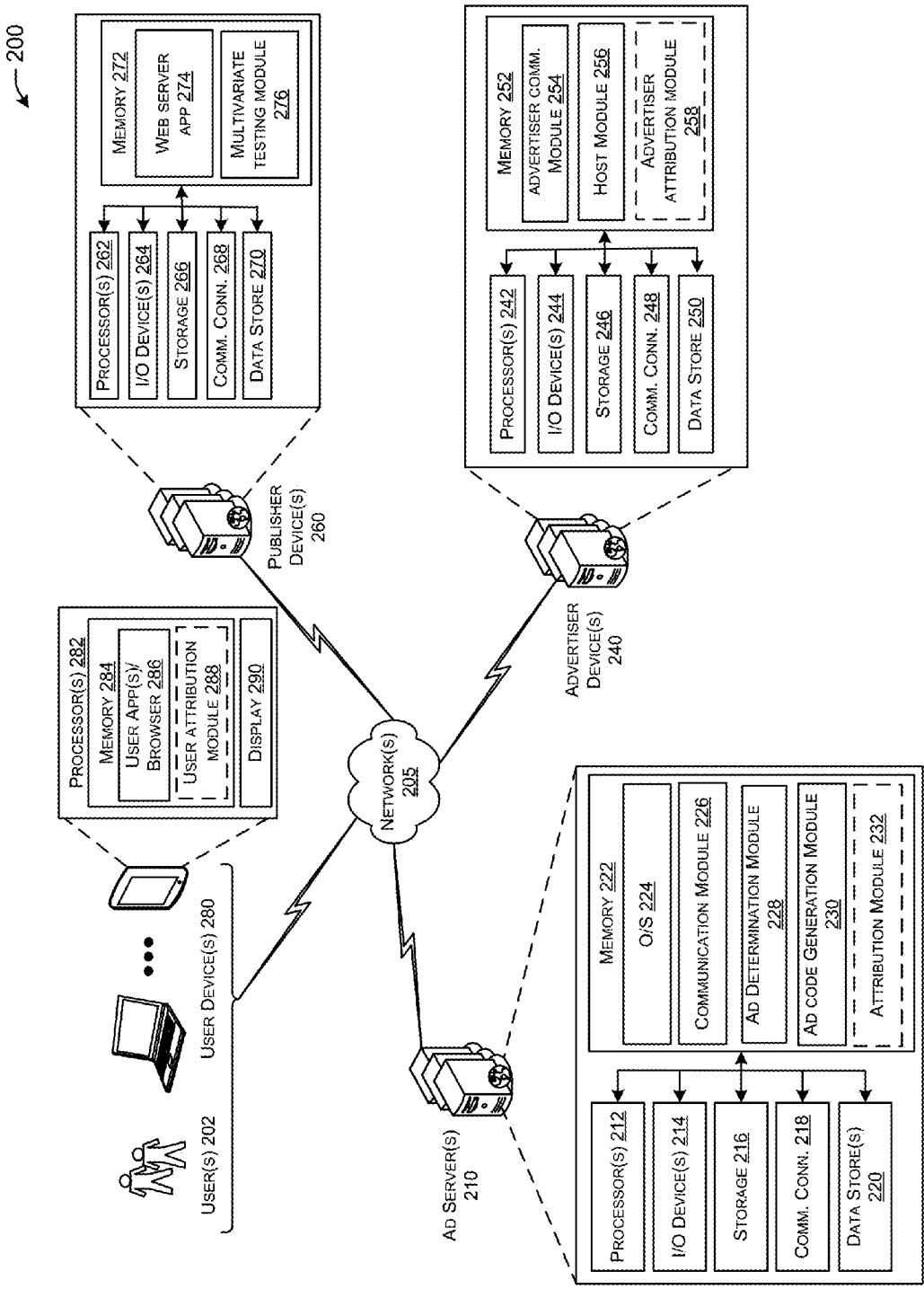
FIG. 2 illustrates an example computing environment in which user actions associated with an ad may be attributed to multivariate testing, according to an embodiment of the disclosure.

FIG. 2 depicts an example computing environment 200 in which user actions associated with an ad may be attributed to multivariate testing, according to an embodiment of the disclosure. As shown, the example computing environment may include, but is not limited to, an ad server 210, an advertiser device 240, a publisher device 260, and a user device 280. Although only one of each type of device is shown in FIG. 2, more may exist in other embodiments. Each of the devices in FIG. 2 may communicate with one another over one or more networks 205 to facilitate the processes described herein. As will be described in greater detail below, various techniques for exchanging information between such devices may be utilized to attribute multivariate test parameters to a particular session or user action, and hence, to determine the effectiveness of the publisher device's 260 presentation of web page content, in certain embodiments herein.

Certain embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. For example, the distribution of software may be downloaded via the Internet.

The one or more networks 205 may include any number of wired or wireless networks that can enable various computing devices in the example computing environment 200 to communicate with one another. In other embodiments, other networks, intranets, or combinations of different types of networks may be used including, but not limited to, the Internet, intranets, cable networks, cellular networks, wireless networks, landline-based networks, or other communication mediums connecting multiple computing devices to one another. Other embodiments may not involve a network and may, for example, provide features on a single device or on devices that are directly connected to one another, e.g., the ad server 210 may be directly connected to the advertiser device 240.

As used herein, the term "device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, Internet appliances, application-specific circuits, microcontrollers, minicomputers, transceivers, or customer premise equipment such as set-top boxes, kiosks, or other processor-based devices. The execution of suitable computer-implemented instructions by one or more processors associated with various devices may form special purpose computers or other particular machines that may implement or facilitate the attribution of web-based user actions to multivariate test parameters.

The devices in FIG. 2 may include one or more processors configured to communicate with one or more memory devices and various other components or devices. For example, the ad server 210 may include one or more processors 212 that are configured to communicate with one or more memory or memory devices 222, one or more input/output (I/O) devices 214, storage 216, one or more communication connections 218, and one or more data stores 220. The processor 212 may be implemented as appropriate in hardware, software, firmware, or a combination thereof. The processors 242, 262, and 282 associated with the advertiser device 240, the publisher device 260, and the user device 280, respectively, may be the same or at least similar to the processor 212, in one embodiment.

The memory 222 of the ad server 210 may store program instructions that are loadable and executable on the processor 212, as well as data generated during the execution of these programs. Depending on the configuration and type of ad server 210, the memory 222 may be volatile, such as random access memory (RAM), and/or non-volatile, such as read-only memory (ROM), flash memory, etc. The memory 252, 272, and 284 associated with the advertiser device 240, the publisher device 260, and the user device 280, respectively, may be the same or at least similar to the memory 222, in one embodiment.

The storage 216 of the ad server 210 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 246 and 266 associated with the advertiser device 240 and the publisher device 260, respectively, may be the same or at least similar to the storage 216, in one embodiment.

The memory 222 and the storage 216, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. In some implementations, the memory 222 may include multiple different types of memory, such as static random access memory (SRAM), dynamic random access memory (DRAM), or ROM.

The one or more communication connections 218 may allow the ad server 210 to communicate with other devices, such as the advertiser device 240, the publisher device 260, the user device 280, databases, user terminals, and various other devices that may exist on the one or more networks 205. In one embodiment, the communication connections 248 and 268 associated with the advertiser device 240 and the publisher device 260, respectively, may be the same or at least similar to the communication connections 218.

The I/O devices 214 may enable a user to interact with the ad server 210. Such I/O devices 214 may include, but are not limited to, a keyboard, a mouse, a pen, a voice input device, a touch input device, a display, a camera or imaging device, speakers, or a printer. The I/O devices 244 and 264 associated with the advertiser device 240 and the publisher device 260, respectively, may be the same or at least similar to the I/O devices 214, in one embodiment.

The data stores 220 may store lists, arrays, databases, flat files, etc. In some implementations, the data stores 220 may be stored in memory external to the ad server 210 but may be accessible via the one or more networks 205, such as with a cloud storage service. The data stores 220 may store information that may facilitate attribution of user actions to multivariate test parameters, as described herein. Such information may include, but is not limited to, multivariate test parameters associated with a publisher's content, identification of publishers from which the multivariate test parameters were received, session identifiers associated with user actions, and identification of user actions (for example, purchase of a product or service, participation in an enrollment program, etc.), among other information.

The data stores 220 may also store various other information, such as ads that may be displayed to a user; user activity information, such as previous purchases of products or services, an amount of the purchases, the time of the purchases, product discounts or incentives used in the purchases; information identifying a user, such as user preferences, demographics, historical content browsed or accessed by the user, other information that may be used to select one or more ads for the user, etc. The data stores 250 and 270 associated with the advertiser device 240 and the publisher device 260, respectively, may be the same or at least similar to the data stores 220, in one embodiment.

The memory 222 may also store an operating system 224 and various software applications and/or modules that may implement or facilitate attribution of user actions to multivariate test parameters, as described herein. Example modules may include, but are not limited to, a communication module 226, an ad determination module 228, an ad code generation module 230, and an attribution module 232. Each of these modules may be implemented as individual modules that provide specific functionality associated with attributing user actions to multivariate test parameters. Alternatively, one or more of the modules may perform all or at least some of the functionality associated with the other modules.

The communication module 226 may configure the ad server 210 to communicate with the devices shown in FIG. 2. For example, the communication module 226 may receive information from the user device 280 that may be used to facilitate the attribution of user actions to multivariate test parameters. Such information may include, but is not limited to, multivariate test parameters, identification of publishers associated with the multivariate test parameters, as well as other information at least some of which will be described in greater detail below. The communication module 226 may also receive information from the advertiser device 240, such as an indication that a user has completed an action and a session identifier associated with the user action, among other information, in some embodiments. The ad server 210 may attribute such information to multivariate test parameters and a publisher associated with the multivariate test parameters, as will be described in greater detail below. The communication module 226 may receive various other information from the devices in FIG. 2 or other devices, in other embodiments.

The communication module 226 may also send various information to other devices. For example, the communication module 226 may send an ad, program code or a command, etc., to the user device 280. The code or command may include a Uniform Resource Locator (URL) embedded into which may be multivariate test parameters associated with a publisher and an identification of the publisher, among other information. The code or command, when executed by the user device 280, may redirect the user device 280 to an advertiser device 240 where a user may purchase a product or service associated with an ad, according to one embodiment. As another example, the communication module 226 may send a session identifier associated with a user to the advertiser device 240, for example, in embodiments in which the advertiser device 240 may attribute a user's actions to multivariate test parameters. As a further example, the communication module 226 may send indications of user actions that are attributable to multivariate test parameters to the publisher device 260, where such information may be further analyzed to determine the effectiveness of a content configuration according to the multivariate test parameters subject to the attribution. The communication module 226 may send various other information to the devices in FIG. 2 or other devices, in other embodiments.

Various communication protocols may be utilized by the communication module 226 to facilitate communication with the devices in FIG. 2. Example protocols may include Hypertext Transfer Protocol (HTTP), Transmission Control Protocol/Internet Protocol (TCP/IP), socket-based protocols such as the WebSocket protocol, or other message formats and/or rules for exchanging information between computing devices to support communication between web-based program code and client-server-based program code, as examples. Additional protocols may include Simple Mail Transfer Protocol (SMTP) or other electronic mail formats for transmitting messages via electronic mail and one or more text formats for supporting e-mail via text messaging to or from a user device 280. In one embodiment, the communication module 226 may include one or more application programming interfaces (APIs) that may utilize such protocols to facilitate communication between the ad server 210 and the devices shown in FIG. 2.

The ad determination module 228 may determine one or more ads for presentation in an ad unit or ad space associated with a web page being presented to a user 202 via a user device 280. In so doing, the ad determination module 228 may consider various information that may facilitate the determination of one or more ads. Such information may include, but is not limited to, text or keywords present in the content of a web page being accessed by the user device 280, information about a user accessing the web page, etc. Such information may be utilized by the ad determination module 228 to determine a relationship between web page content, the user, etc., and potential ads that may be displayed on the web page. Ads that are determined to be related to the web page content and/or the user may be selected for presentation in the ad unit associated with the web page.

The ad code generation module 230 may generate a command that may configure the user device 280 to perform various functions, in one embodiment. For example, the ad code generation module 230 may generate a URL (or other reference) that causes the user device 280 to access the advertiser device 240, for example, when a user 202 of the user device 280 clicks on an ad such as an ad selected by the ad determination module 228. The ad code generation module 230 may construct the URL to include multivariate test parameters, an identification of the publisher device 260 associated with the multivariate test parameters, an address or other unique identification of the advertiser device 240 associated with the ad, etc. Such generation by the ad code generation module 230 may facilitate attribution of the multivariate test parameters and publisher identification to a session associated with a user action, as will be described in greater detail below.

The attribution module 232 may attribute or associate various information together such that a user's actions may be attributed to particular multivariate test parameters, in certain embodiments herein. In one embodiment, the attribution module 232 may attribute a session identifier associated with a user action (for example, purchasing a product associated with an ad on which the user clicked, completing an online enrollment program, etc.) to multivariate test parameters associated with content on a web page that includes the ad clicked by the user, as well as attribute the session identifier to an identification of the publisher device 260 associated with the content on the web page.

In one embodiment, the attribution module 232 may identify the multivariate test parameters and/or the publisher identification by searching for such information using the session identifier. For example, upon obtaining a session identifier associated with a user purchasing a product, the attribution module 232 may identify the multivariate test parameters and/or the publisher identification as stored in association with the session identifier. In one embodiment, such information may be stored in a cookie along with a session identifier, for example, when a user clicks on an ad and is directed to the advertiser device 240. In other embodiments, such information may be stored in the data store 220 or other storage device. Detailed descriptions of attributing information associated with user actions to multivariate test parameters and/or publisher identifications will be described in greater detail below.

The attribution module 232 may also determine whether a sufficient number of users accessed web page content that is the subject of a multivariate test. In one embodiment, a sufficient number of users may be a predefined or predetermined total number of users required to access the web page before the multivariate test may be considered valid. In another embodiment, the number of users may be a predefined number of users based on a number of multivariate variations that may be generated for a multivariate test. In other embodiments, the number of users may have statistical significance. In this way, identification of a user and corresponding actions associated with the user may not be disclosed to the publisher device 260.

The above configuration of the ad server 210 is for purposes of illustration and is not meant to be limiting. Fewer or more functions may be performed by the ad server 210 in other configurations. For example, all or at least a portion of the attribution of user actions to multivariate test parameters may be performed by one or more devices other than the ad server 210, in some embodiments.

Turning to the content of the memory 252 of the advertiser device 240, the memory 252 may include various software and/or program modules, such as an advertiser communication module 254, a host module 256, an advertiser attribution module 258 (which may be optional), etc. Each of these modules may be implemented as individual modules that provide specific functionality associated with attributing user actions to multivariate test parameters. Alternatively, one or more of the modules may perform all or at least some of the functionality associated with the other modules.

The advertiser communication module 254 may configure the advertiser device 240 to communicate with the devices in FIG. 2. For example, the advertiser communication module 254 may receive a request from the user device 280 to access content associated with an ad on which a user 202 utilizing the user device 280 clicked. The advertiser communication module 254 may also receive requests from the user device 280 to purchase a product or service associated with the ad. The advertiser communication module 254 may receive various other information from the devices in FIG. 2 or other devices, in other embodiments.

The advertiser communication module 254 may also send various information to facilitate the processes described herein. Such information may include, but is not limited to, a notification that a user 202 of the user device 280 has completed an action, such as purchasing a product or enrolling in a program; a session identifier associated with a user action, which may be sent to the ad server 210, the data store 220 or other storage device, etc.; and a request for test parameters and/or a publisher identification associated with the test parameters, for example, when the advertiser device 240 performs attribution of a user action to multivariate test parameters. A detailed example of such attribution will be described below.

The host module 256 may implement any number of functions for the advertiser device 240. Such functions may facilitate various user actions, such as purchasing a product or service associated with an ad, enrolling in a program, completing a form, selecting an image on a web page, or any number of actions performed by a user that may be captured by the host module 256 or other mechanism associated with the advertiser device 240. The host module 256 may include program code for rendering content for interaction by the user, as well as code for capturing and/or storing information input by the user, among other functions. Upon a user completing an action, the host module 256 may communicate an indication that a particular user action has been completed to the ad server 210 or other devices in FIG. 2, where the user action may be attributed to multivariate test parameters. In one embodiment, an indication that a user action has been completed may be communicated to the devices in FIG. 2 via the communication module 226, as described above.

As described, the advertiser device 240 may attribute a user's actions to multivariate test parameters. In one embodiment, such attribution may be performed by the advertiser attribution module 258. The advertiser attribution module 258 may perform the same or similar functions to the attribution module 232, in one embodiment. Examples of attribution performed by the advertiser attribution module 258 will be described in greater detail below.

Turning to the contents of the memory 272 of the publisher device 260, the memory 272 may include a web server application 274 and a multivariate testing module 276, among other modules. The web server application 274 may perform various functions to facilitate the processes described herein. One such function may include serving web pages to the user devices 280. Such web pages may include content that may be rendered by a browser or one or more user applications 286 associated with the user device 280. Another function that may be performed by the web server application 274 includes inserting or embedding program code, variables, identifiers, or other information into program code that is distributed to the user device 280, where it may cause the user device 280 to access various devices, such as the ad server 210, in one embodiment. According to one configuration, the web server application 274 may embed multivariate test parameters, an identification of a publisher associated with the multivariate test parameters, and/or other information into HTML, JavaScript, or other code or markup languages for sending to the user device 280. As will be described in greater detail below, such information may be used by one or more devices to attribute user actions to the multivariate test parameters. The above functions associated with the web server application 274 are not meant to be limiting. Various other functions may be performed in other embodiments.

The multivariate testing module 276 may perform functions associated with implementing multivariate testing of content on a web page, among other functions. As used herein, multivariate testing may refer to the process of testing multiple components of a web page or website. Such testing may be performed in a live environment according to certain configurations. Multivariate testing may be utilized to determine which variation or presentation of content meets the defined goals of a website better than other variations. Numerous components of a web page may be varied to make such a determination, such as the location of an ad, the font size of content on the web page, the placement of a headline on the web page, the placement of an ad (for example, from left-to-right, or top-to-bottom), or any number of other attributes that may be associated with a web page or content on the web page. Such attributes or components may be referred to herein as multivariate test parameters.

In one embodiment, the multivariate testing module 276 may determine multivariate test parameters associated with a multivariate test and may subsequently vary each parameter to ensure that variations of each desired web page component are tested. In one embodiment, the multivariate testing module 276 may establish an identification of a multivariate test that may correspond to a particular setting for each parameter associated with a multivariate test. The multivariate testing module 276 may alter the particular settings, along with the identification of the multivariate test, to facilitate testing of different configurations of web page content identified by the multivariate test parameters.

The multivariate testing module 276 may also embed information into HTML, JavaScript, or other code associated with content on a web page. Such information may include the determined multivariate test parameters and an identification of the publisher of the content. In some embodiments, additional information may include, but is not limited to, information associated with the user device 280 and/or a user 202 of the user device 280 that accessed the content (e.g., user preferences, demographics, etc.), additional information associated with the publisher of the content, key words in the content, etc. The embedded information may facilitate attributing user actions to multivariate test parameters, as will be described in greater detail below.

The multivariate testing module 276 may also analyze the results of a multivariate test, which may be received from the ad server 210, in one embodiment. Analysis of the multivariate test may include determining which multivariate test parameters are most effective at meeting objectives or goals associated with content on a web page. In one embodiment, the attribution module 232 of the ad server 210 may associate or segment multivariate test parameters according to user actions and may send such information to the publisher device 260, where it may be analyzed by the multivariate testing module 276, in one embodiment. One or more statistical tools or models may be used to perform such analysis, in some embodiments. The multivariate testing module 276 may also determine whether a sufficient number of users have accessed web page content subjected to a multivariate test, as described in association with the attribution module 232, in one embodiment.

Turning to the contents of the memory 284 of the user device 280, the memory 284 may include one or more user applications 286 and a user attribution module 288, among other modules. The one or more user applications 286 may perform various functions for the user device 280. For example, a user application 286 may receive and display ads and other web page content for a user 202 utilizing the user device 280. In one example, a user application 286 may include a dedicated application or a web browser application, either of which present web pages or other content via a display 290. The web page or content may include program code that may configure the user device 280 to send information to other devices in FIG. 2, such as the ad server 210. In one embodiment, the program code may include an iframe tag (or other reference) embedded within HTML, JavaScript, or other program code. As described, such program code may cause the user device 280 to access another device, such as the ad server 210 to request an ad, or the advertiser device 240 to access content associated with an ad.

The user attribution module 288 may facilitate the attribution of user actions to multivariate test parameters. In one embodiment, the user attribution module 288 may receive multivariate test parameters (or an identification thereof as described above) and a publisher identification associated with the multivariate test parameters, and may subsequently associate the multivariate test parameters and publisher identification with a session identifier associated with a user action. The user attribution module 288 may further store the information such that the multivariate test parameters may be identified based at least in part on a session identifier. For example, upon a user 202 completing an action such as purchasing an ad, a session identifier associated with the purchase may be used to identify (for example, perform a look-up or selection in a database) of the multivariate test parameters and the corresponding publisher identification as stored. In this way, user actions may be attributed to multivariate test parameters. The user attribution module 288 may be the same or at least similar to the attribution module 232, in some embodiments.

The above configurations in FIG. 2 are not meant to be limiting. Numerous other configurations, devices, etc., may exist. Further, the processes described in FIG. 2 may not be limited to the particular devices shown in FIG. 2. The processes may be located at different devices or may be distributed across multiple devices. For example, functionality associated with attributing user actions to multivariate test parameters may be performed by the ad server 210, the advertiser device 240, or the user device 280. Numerous other examples may exist.

Figure 3:
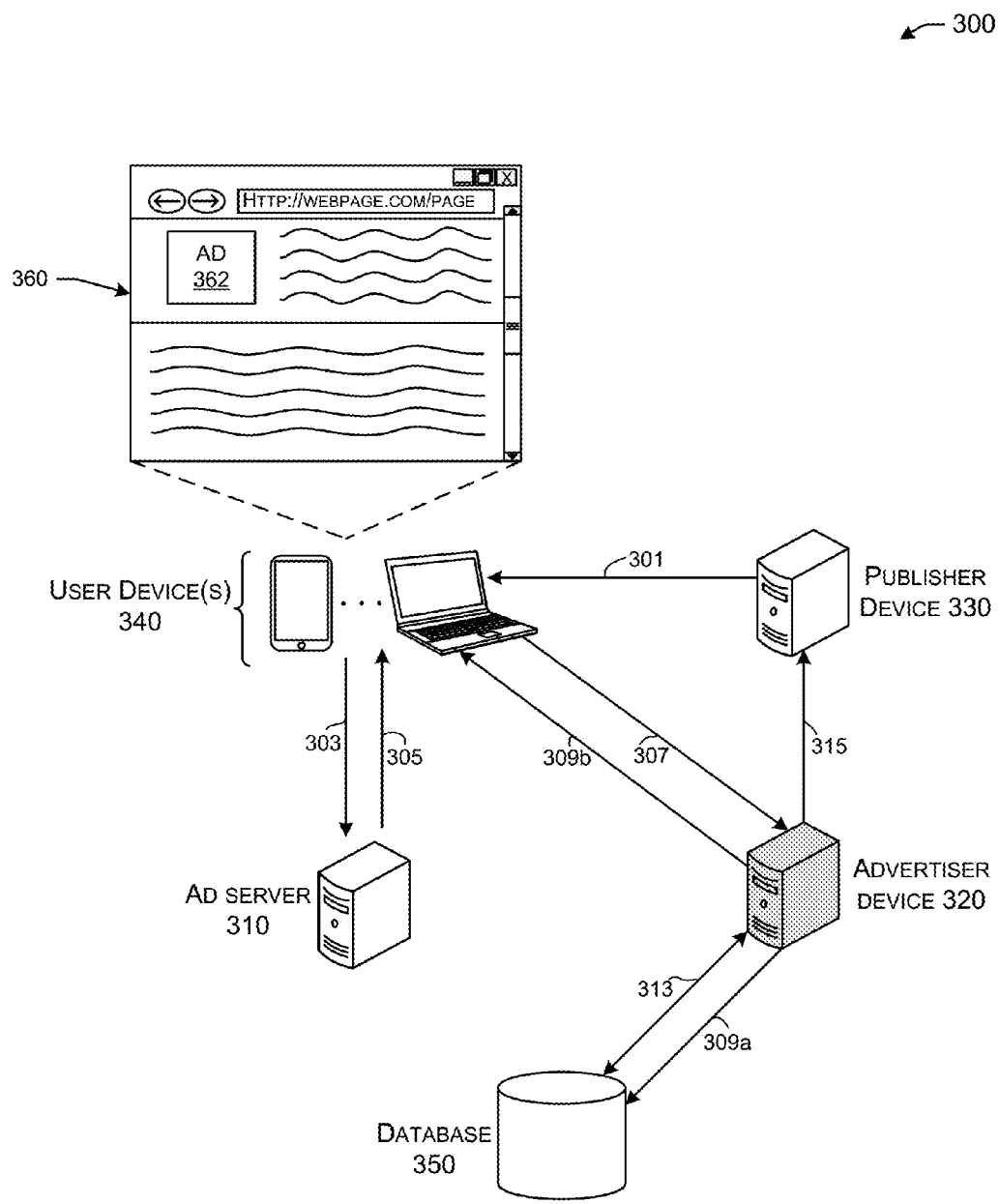
FIG. 3 depicts a schematic diagram of an example process in which an advertiser device attributes a user's actions to multivariate test parameters, according to an embodiment of the disclosure.

FIG. 3 depicts a schematic diagram of an example process in which an advertiser device 320 attributes a user's actions to multivariate test parameters, according to an embodiment of the disclosure. The configuration in FIG. 3 may include an ad server 310, an advertiser device 320, a publisher device 330, and a user device 340, as shown. In one configuration, the ad server 310 and the advertiser device 320, as well as one or more other devices, may comprise an advertising system that may implement or facilitate the processes described herein. Although only one of each type of device is shown, more may exist in other configurations. In one example, the advertiser device 320 may attribute the user's purchase of a product or service, after the user clicks on an ad 362 related to the product or service, to multivariate test parameters associated with content on a publisher web page 360 in which the ad 362 is presented.

According to one configuration, the publisher device 330 may send content to the user device 340, as shown in communication 301. The content may be included in HTML, JavaScript, or other program code to facilitate rendering of the content by a web browser or dedicated application on the user device (for example, by the web browser 286 in FIG. 2). The content may also include a link or reference in the HTML or program code that when executed may cause the user device 340 to request an ad from the ad server 310, as shown in communication 303, among other functions. The link or reference may include an address of a destination device (for example, the ad server 310), multivariate test parameters (or an indication of a multivariate test or tag that includes the multivariate test parameters), an identification of a publisher associated with the publisher device 330, etc.

The ad server 310 may perform various functions to facilitate the processes in FIG. 3. For example, upon receiving a request for an ad from the user device 340, the ad server 310 may identify multivariate test parameters and an identification of a publisher of the content on the web page 360 (for example, via the communication module 226 in FIG. 2). The ad server 310 may also identify other information in the request, such as information that may facilitate determining an ad 362 for presentation on the web page 360. Such information may be associated with a user of the user device 340, such as an identification of the user, one or more preferences associated with the user, demographic information for the user, etc.; information associated with the content, such as one or more keywords or search terms describing the content, etc. Other information that may facilitate other processes performed by the ad server 310 may exist in other examples.

As mentioned, the ad server 310 may determine one or more ads 362 for presentation in one or more ad units of the web page 360 rendered by the user device 340. The ad determination module 228 in FIG. 2 may perform such a determination, in one embodiment. The one or more ads may be determined based on any number of factors, such as a user's historical behavior, browse history, purchase history, search history, session history, key words identifying web page content, etc. Other embodiments may not involve consideration of such information in determining an ad for presentation on the web page 360.

In one embodiment, the determined ad may be associated with a first party advertiser, which may be an entity that presents an ad on the web page 360 on its own behalf or on behalf of one or more other entities. In other embodiments, the determined one or more ads may be associated with a third party advertiser, which may rely on a first party advertiser to present ads on its behalf, including submitting bids for ad space. In the example of FIG. 3, the advertiser device 320 is considered a first party advertiser that may also perform all or at least a portion of the functions associated with the ad server 310.

Upon determining an ad, the ad server 310 may generate JavaScript program code (or other program code) that includes the ad or a reference to the ad, the multivariate test parameters, and the identification of the publisher, as received in the communication 303, in one embodiment. Such generation may be performed by the ad code generation module 230, in one embodiment. The ad server 310 may further include an identification of a destination device, such as a TCP/IP address or a domain name associated with the advertiser device 320, in the program code. In one configuration, the identification of the destination device, the multivariate test parameters, and the publisher identification may be included in a URL reference and sent to the user device 340, as shown in communication 305.

The URL reference, when executed by the user device 340, may cause the user device 340 to communicate with the advertiser device 320, as shown in the communication 307. As an example, the user device 340 may be redirected to the advertiser device 320 after a user clicks on an ad received in the communication 305. In one example, the user device 340 may be directed to a web page in which the user may purchase a product or service associated with the ad 362. Such a purchase may be considered a user action herein.

The communication 307 may include the multivariate test parameters and the publisher identification, among other information such as an identification of the user device 320 and a user utilizing the user device 340, etc. Upon receiving such information, the advertiser device 320 may store the information in the database 350, as shown in communication 309a, or other data store. The advertiser device 320 may also generate a session identifier associated with the user's interaction with the advertiser device 320 (for example, via the host module 256 of the advertiser device 240 in FIG. 2). The session identifier may be stored in the database 350 in association with the relevant multivariate test parameters and the publisher identification. One or more of this information may also, or as an alternative, be stored in a cookie on the user device 340, as shown in communication 309b. In this way, a session identifier may be associated with multivariate test parameters and an identification of a publisher of content on the web page 360, among other information.

Upon a user purchasing a product or service associated with the ad on which the user clicked, the advertiser device 320 may determine the session identifier associated with the purchase and associate or attribute it to the multivariate test parameters and publisher identification as stored in either the cookie at the user device 340 or the database 350 (as shown in communication 313), in certain embodiments. Such attribution may include matching the session identifier associated with the purchase to a stored session identifier and subsequently identifying the multivariate test parameters and publication identification associated with the stored session identifier, in one embodiment. The attribution may be performed by the advertiser attribution module 258 of the advertiser device 240 in FIG. 2, in one embodiment.

The advertiser device 320 may store each attribution of a user action (for example, the purchase of a product associated with an ad) to multivariate test parameters, as also shown in the communication 313. The advertiser device 320 may send the results of the multivariate test to the publisher device 330, as shown in communication 315, in one embodiment. Such results may include a value associated with a goal or objective of a publisher initiating the multivariate test, in one embodiment. For example, a publisher that wants to determine how much revenue is generated for each multivariate test parameter may receive a purchase amount for each purchase associated with the multivariate test parameter. Other transaction parameters, such as a quantity of a product purchased, a discount amount, a profit amount, the time of day of a purchase, or any other information associated with a purchase, a user action, or a transaction may be received in other examples. As described, such information may be sent in real-time, batch mode, or after determining that a sufficient number of users has accessed the web page 360 subjected to a multivariate test. A sufficient number of users may be determined based on a predefined total number of users or a statistically significant number of users based on a number of possible variations of multivariate test parameters used in the multivariate test. Other considerations or criteria may exist in other embodiments.

Figure 4:
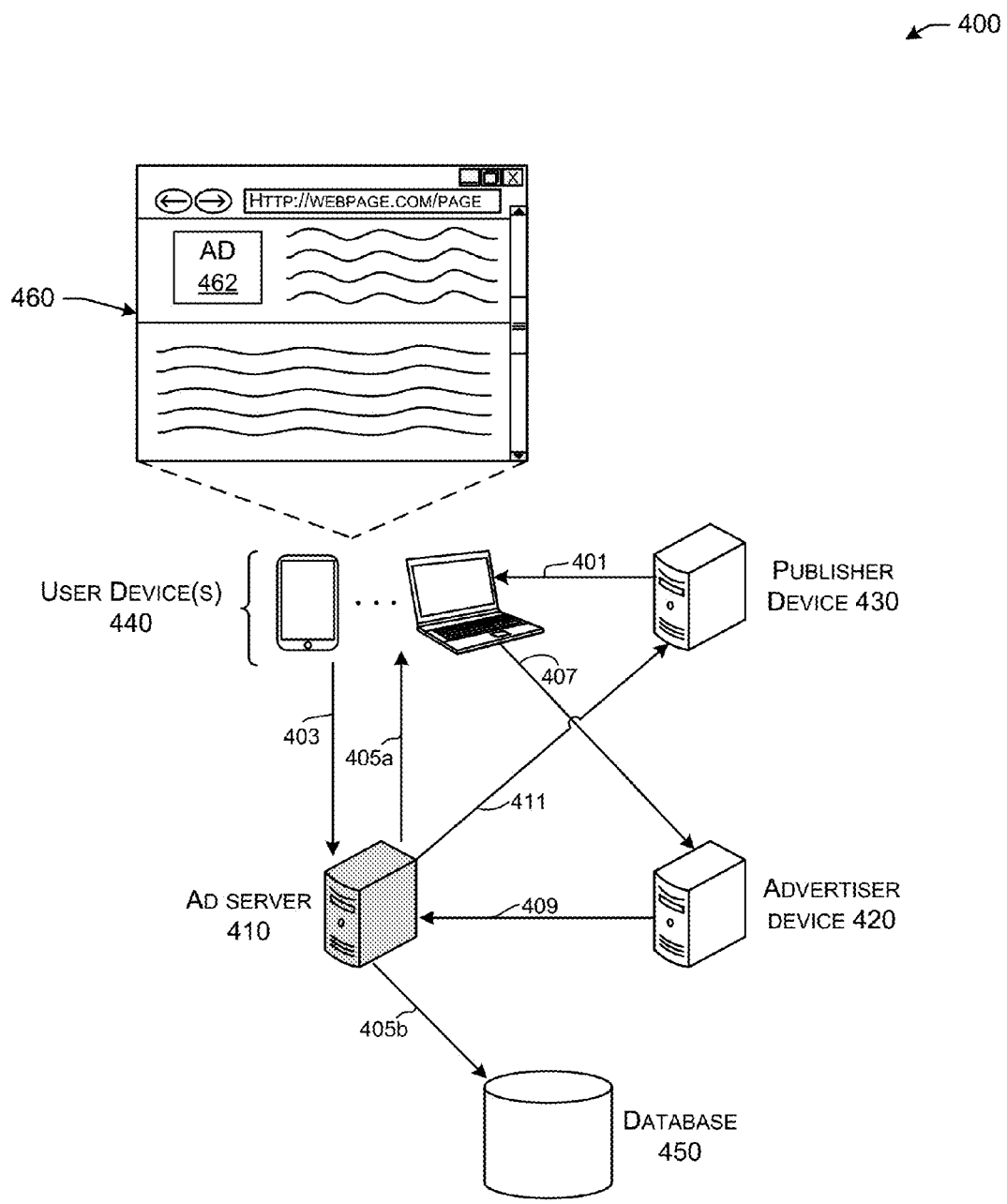
FIG. 4 illustrates a schematic diagram of an example process in which an ad server attributes a user's actions to multivariate test parameters, according to an embodiment of the disclosure.

FIG. 4 depicts a schematic diagram of an example process in which an ad server attributes a user's actions to multivariate test parameters, according to an embodiment of the disclosure. The configuration in FIG. 4 may include an ad server 410, an advertiser device 420, a publisher device 430, and a user device 440. Although only one of each type of device is shown, more may exist in other configurations. The advertiser device 420 may be a third party advertiser device in the present example.

According to one configuration, the publisher device 420 may send content to the user device 440, as shown in communication 401. The content may be included in HTML, JavaScript, or other program code to facilitate rendering of the content by a web browser or dedicated application on the user device (for example, by the web browser 286 in FIG. 2). The content may also include a link or reference in the HTML or program code that when executed may cause the user device 440 to request an ad from the ad server 410, as shown in the communication 403, among other functions. The link or reference may include an address of a destination device (for example, the ad server 410), multivariate test parameters (or an indication of a multivariate test or tag that includes the multivariate test parameters), an identification of a publisher associated with the publisher device 430, etc.

The ad server 410 may perform various functions to facilitate the processes in FIG. 4. Such functions may be similar to those performed in FIG. 3 above, in one embodiment. The functions may include identifying multivariate test parameters, an identification of a publisher associated with the publisher device 430 (for example, via the communication module 226 in FIG. 2), and other information that may facilitate the processes described herein. The identified information may be the same or similar to that described above in FIG. 3, in one embodiment. One or more ads may also be determined by the ad server 410.

Another function performed by the ad server 410 may include determining one or more ads 462 for presentation on the web page 460 (for example, by the ad determination module 228 in FIG. 2). Such a determination may be the same or similar as that described above in association with FIG. 3, in one embodiment.

Another function performed by the ad server 410 may include generating a unique session identifier associated with the user of the user device 440. Such an identifier may include any text, number, string, or any combination thereof, that may uniquely identify a session for the user. As will be described in greater detail below, the unique session identifier may be used to attribute a user's actions to multivariate test parameters associated with the web page 460.

The ad server 410 may further store the unique session identifier in association with the multivariate test parameters and the publisher identification received in the communication 403. In one embodiment, such information may be stored in a cookie associated with the user device 440 (as shown in communication 405a) and/or in the database 450 (as shown in communication 405b), or other storage mechanism. The determined ad 462 may also be sent to the user device 440 in the communication 405a. Other functions may be performed by the ad server 410 in other examples.

Upon clicking on the ad 462, a user of the user device 440 may be directed to the advertiser device 420 (as shown in communication 407), where the user may perform various actions. Example actions may include completing a form to enroll in a program, completing a survey, providing certain identifying information, performing other actions in which the user accesses or interacts with content provided by the advertiser device 420, etc. The user actions may correspond to a goal objective of an advertiser associated with the advertiser device 420. For example, the advertiser may desire to increase the number of credit card applications it receives from new users. In this example, completing a credit card form may be the action that the advertiser desires to optimize. A publisher associated with the publisher device 430 may therefore desire to obtain knowledge regarding the placement, layout, orientation, or other attributes that may be captured by multivariate test parameters, of its content on the web page 360 to facilitate the advertiser's objective, which may in turn facilitate meeting at least one of the publisher's objectives (for example, increased revenues associated with an increased number of credit card signups at the advertiser device's 420 website.

In one embodiment, the host module 256 of the advertiser device 240 in FIG. 2 may provide the content or interface with which the user interacts. Upon the user completing an action, the advertiser device 420 (for example, via the advertiser communication module 254 in FIG. 2) may send certain information to the ad server 410, as shown in communication 409. Such information may include, but is not limited to, an indication that the user action was completed and the unique session identifier. The unique session identifier may have been determined by the advertiser device 420 (for example, via the advertiser communication module 254 in FIG. 2) accessing a cookie associated with the user device 440 upon the advertiser device 420 being contacted by the user device 440, as shown in communication 407.

Upon the ad server 410 receiving the indication and the unique session identifier from the advertiser device 420, the ad server 410 may attribute the user's action to the multivariate test parameters and the publisher identification. Such attribution may include matching the session identifier associated with the user action to the stored unique session identifier and subsequently identifying the multivariate test parameters and publication identification associated with the stored unique session identifier, in one embodiment. The attribution may be performed by the attribution module 232 of the ad server 210 in FIG. 2, in one embodiment.

The ad server 410 may send the attributed information to the publisher device 430, as shown in communication 411. As described, the information may be sent in real-time, in batch mode, or after a sufficient number of users have accessed the web page 460 subjected to a multivariate test. Examples of what may constitute a sufficient number of users are described above.

Figure 5:
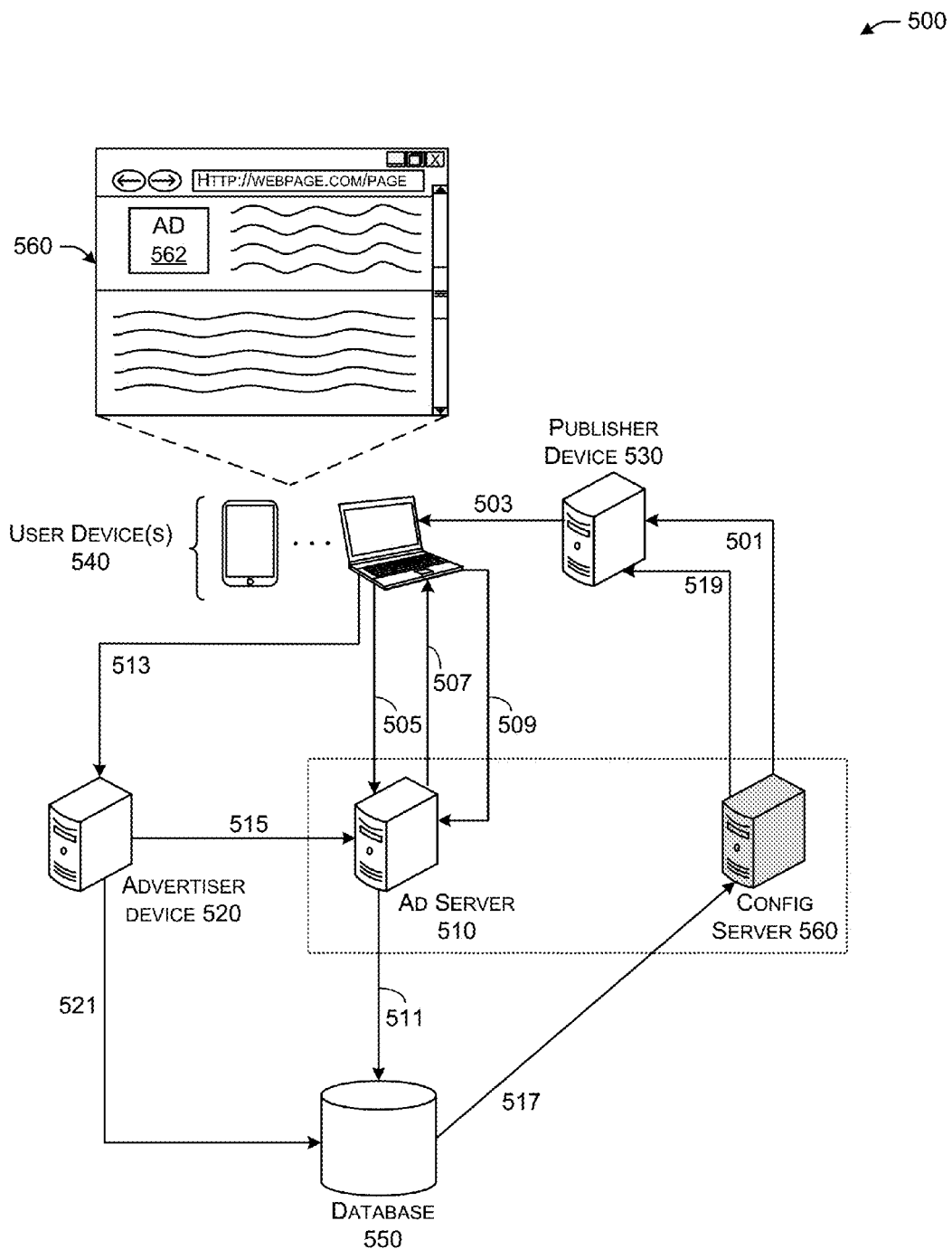
FIG. 5 illustrates a schematic diagram of an example process for attributing a user's web-based actions to multivariate testing of web page content in which a configuration server associated with an ad server performs the attribution, according to an embodiment of the disclosure.

FIG. 5 depicts a schematic diagram of an example process in which a configuration server associated with an ad server attributes a user's actions to multivariate test parameters, according to an embodiment of the disclosure. The configuration in FIG. 5 may include an ad server 510, a configuration server 560, an advertiser device 520, a publisher device 530, and a user device 540, as shown. Although only one of each device is shown, more may exist in other configurations. In one configuration, the ad server 510 and the configuration server 560 may be associated with the same entity in an ad network 110, as shown in FIG. 1. The configuration server 560 may be a device that performs dedicated functions to facilitate the processes described herein. Such functions will be described below. In one configuration, all or at least a portion of the functions performed by the configuration server 560 may be performed by the ad server 510 or one or more other devices.

The configuration server 560 may send program code to the publisher device 530, as shown in communication 501. The program code may include, among other things, instructions that capture and associate multivariate test parameters, an identification of a publisher associated with the publisher device 530, and a session identifier associated with a user's activity, among other information. An example of such association will be described below. The program code may be developed using JavaScript or various other programming languages in various embodiments, including machine interpreted or machine compiled and executable programming languages.

The JavaScript or other program code may receive multivariate test parameters associated with the web page 560 and the identification of the publisher device 530. In one embodiment, the program code may embed such information in a URL reference that directs the user device 540 to another device, such as the ad server 510. The JavaScript program code may also include content, or a reference to the content, associated with the web page 560 for sending to the user device 540. The publisher device 530 (for example, via the web server application 274 in FIG. 2) may communicate with the program code to facilitate the distribution of the content, in one embodiment.

The program code that includes the multivariate test parameters and the publisher identification may be sent to the user device, as shown in communication 503. The multivariate test parameters and the publisher identification may be stored in a cookie at the user device 540 when the web page 560 renders, in one embodiment. The program code received in the communication 503 may provide such functionality, in one embodiment. In some embodiments, the JavaScript code may store the multivariate parameters and the publisher identification in a data store (for example, the database 550) or other storage mechanism.

The program code may send a request for an ad 562 to the ad server 510, as shown in communication 505. In one embodiment, the request may include the multivariate test parameter and the publisher identification, among other information such as that described above in FIG. 3, which the ad server 510 may store in a data store. The ad server 510 may determine an ad 562 for presenting on the web page 560 (for example, via the ad determination module 228 in FIG. 2). In one embodiment, the ad 562 may be determined using the same or a similar process as that described above in FIG. 3. In addition to determining the ad 562, the ad server 510 may also generate a session identifier associated with the user. The generated session identifier may be sent to the user device 540, as shown in communication 507. Additional information may also be sent in the communication 507, such as the multivariate test parameters and the publisher identification, in some embodiments. Such information may be included as a parameter in a URL reference embedded in HTML or program code that may also be sent to the user device 540 in the communication 507. The URL reference may also specify a destination device that, when clicked by the user, directs the user to the destination device (for example, the advertiser device 520), as will be described below.

The program code at the user device 540, for example, via the user attribution module 288 in FIG. 2, may attribute the session identifier to the stored multivariate test parameters and the publisher identification and store such information in the cookie at the user device 540. Such attribution may associate the session identifier with the multivariate test parameters and the publisher identification in the cookie. In some embodiments, the attribution may include validating that the session identifier is stored in association with the proper multivariate test parameters and publisher identification. For example, in embodiments in which the multivariate test parameters and publisher identification are sent in the communication 507, the user device 540 may determine a match between the multivariate test parameters received in communication 507 and the multivariate test parameters stored in the cookie at the user device 540. If a match is determined, then the session identifier may be stored in association with the matched multivariate test parameters and corresponding publisher identification.

In one embodiment, the user device 540 may send the session identifier, the multivariate test parameters, and the publisher identification to the ad server 510, as shown in communication 509. All or at least a portion of such information may be communicated in other embodiments. The ad server 510 may store the received information in the database 550, as shown in communication 511, or other data store. The session identifier may be stored in association with the multivariate test parameters and the publisher identification associated with the user device's 540 request for the ad 562.

Upon the user clicking on the ad 562, the user of the user device 540 may be directed to the advertiser device 520, as shown in communication 513. The user may perform any number of actions at the advertiser device 520, such as the actions identified above in FIG. 1. Such actions may correspond to a goal objective of an advertiser associated with the advertiser device 520, in one embodiment. The host module 256 associated with the advertiser device 240 in FIG. 2 may provide the content or interface with which the user interacts.

Upon the user performing an action, information associated with the action (for example, an indication that the action was performed and an identification of the action) and the session identifier associated with the action may be sent to the ad server 510, as shown in communication 515. Other information may be sent in other embodiments. The advertiser device 520 may obtain the session identifier from a cookie associated with the user device 540, in one embodiment. The advertiser device 520 may store the session identifier, the action performed, and other information associated with the user's action in the database 550 or other data store. In some embodiments, the advertiser device 520 may store the information associated with the action in the database 550 or other data store, as shown in communication 521. In one configuration, the session identifier and the action performed may be stored in a database table that is separate from a database table in which the session identifier stored in association with the multivariate test parameters and the publisher identification may be stored. The tables may be linked together by the session identifier, in one configuration. Other relational data sources may be used in other configurations to facilitate linking relational information together.

The configuration server 560 may attribute session identifiers associated with a user's action to multivariate test parameters. In one embodiment, the attribution may be performed in batch mode, for example, according to a schedule, a predefined time, a recurring time interval, etc. In one example, the attribution may include the configuration server 560 accessing the database 550 to identify each session identifier associated with an action performed by a user, as shown in communication 517. For each session identifier associated with a user action, the configuration server 560 may determine multivariate test parameters and a corresponding publisher identification. The results of such attributions may be sent to the publisher device 530, as shown in communication 519. As described above, the results may be sent to the publisher device 530 if a sufficient number of users have accessed the web page 560 subjected to a multivariate test, in one embodiment.

The above configurations in FIGS. 3-5 are for purposes of illustration and are not meant to be limiting. Numerous other configurations in which different processes, types of devices, information exchanges, etc., may also exist. Also, all or at least a portion of the functions described in association with a particular device may be performed by one or more other devices.

Figure 6:
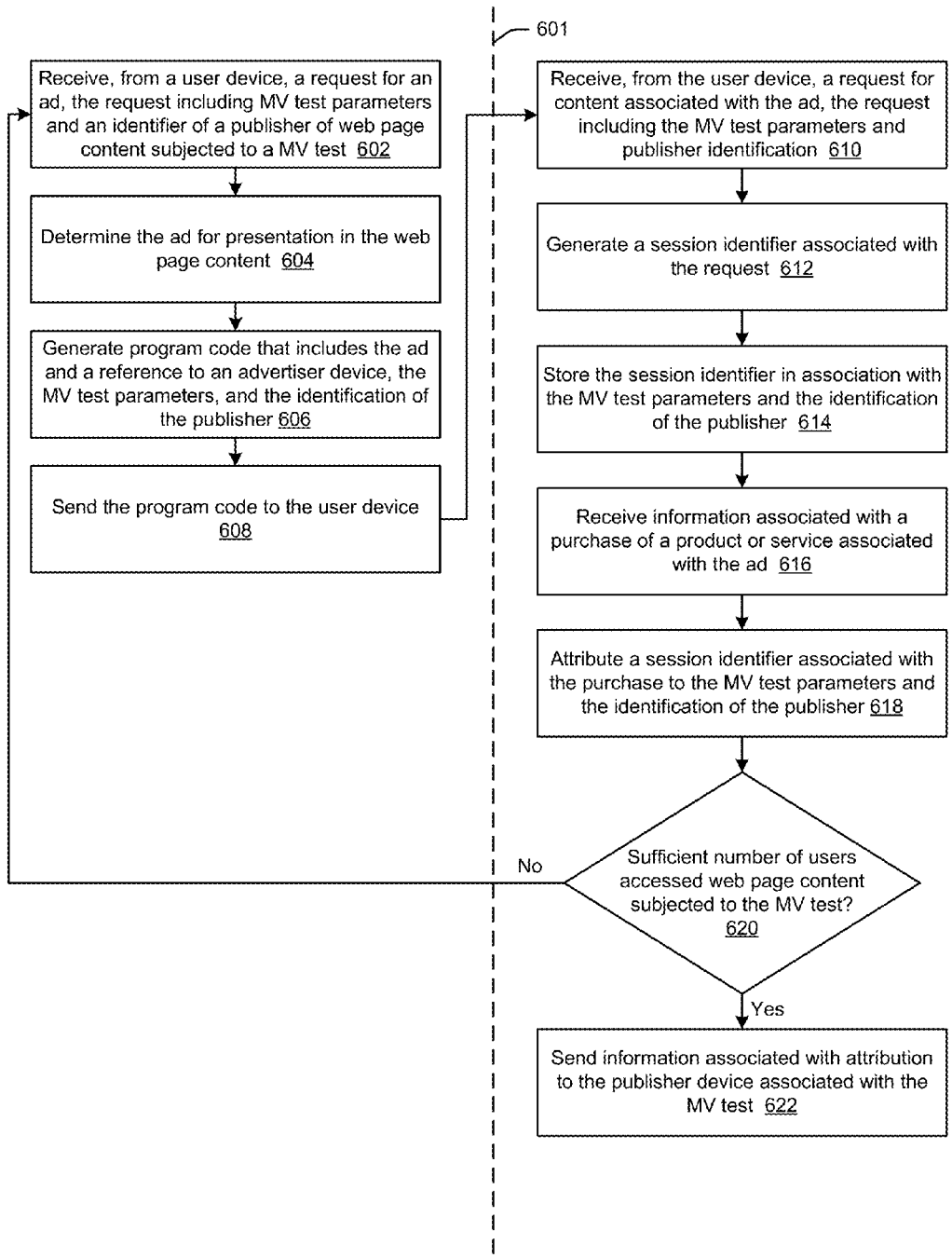
FIG. 6 illustrates a flow diagram of an example process in which an advertiser device attributes a user's actions to multivariate test parameters, according to an embodiment of the disclosure.

FIG. 6 illustrates a flow diagram of an example process in which an advertiser device attributes a user's actions to multivariate test parameters, according to an embodiment of the disclosure. According to one configuration, the example process may be performed by an ad server (for example, the ad server 210 in FIG. 2) and an advertiser device (for example, the advertiser device 240 in FIG. 2), which may be associated with a first party advertiser in the present example. Processes associated with the ad server are shown to the left of the dotted line 601 while processes associated with the advertiser device are shown to the right of the dotted line 601.

The example process may begin at block 602, where a request for an ad may be received from a user device (for example, via the communication module 226). The request may also include multivariate test parameters and an identification of a publisher of web page content subjected to a multivariate test. In response to the request, an ad may be determined for presentation in the web page content at block 604 (for example, via the ad determination module 228). At block 606, HTML or other program code that includes the determined ad and a reference to the advertiser device, the multivariate test parameters, and the identification of the publisher may be generated. The program code may be sent to the user device at block 608.

Ad block 610, the advertiser device may receive a request for content associated with the determined ad (for example, via the advertiser communication module 254). The request may include the multivariate test parameters and the identification of the publisher, among other information. A session identifier associated with the request may be generated (for example, by the host module 256) at block 612. The session identifier may be stored in association with the multivariate test parameters and the identification of the publisher at block 614. Such information may be stored in a cookie associated with the user device and/or in a data store in various embodiments.

Information associated with a user action, such as a purchase of a product or service associated with the ad and a session identifier associated with the purchase, may be received at block 616. The session identifier associated with the purchase may be attributed to the corresponding multivariate test parameters and publisher identification, for example, as stored in the cookie of the user device or a data store, at block 618. If a sufficient number of users have accessed the web page content subject of the multivariate test at block 620, as described above, then information associated with the attribution of the user's purchase (or other action) to the multivariate test parameters and publisher identification may be sent to the publisher device (for example, the publisher device 240 in FIG. 2), at block 622. If a sufficient number of users have not accessed the web page content, then processing may return to block 602. In such instances, the attribution of the user's action to the multivariate test parameters and publisher identification may be stored in a data store for subsequent access and analysis.

Figure 7:
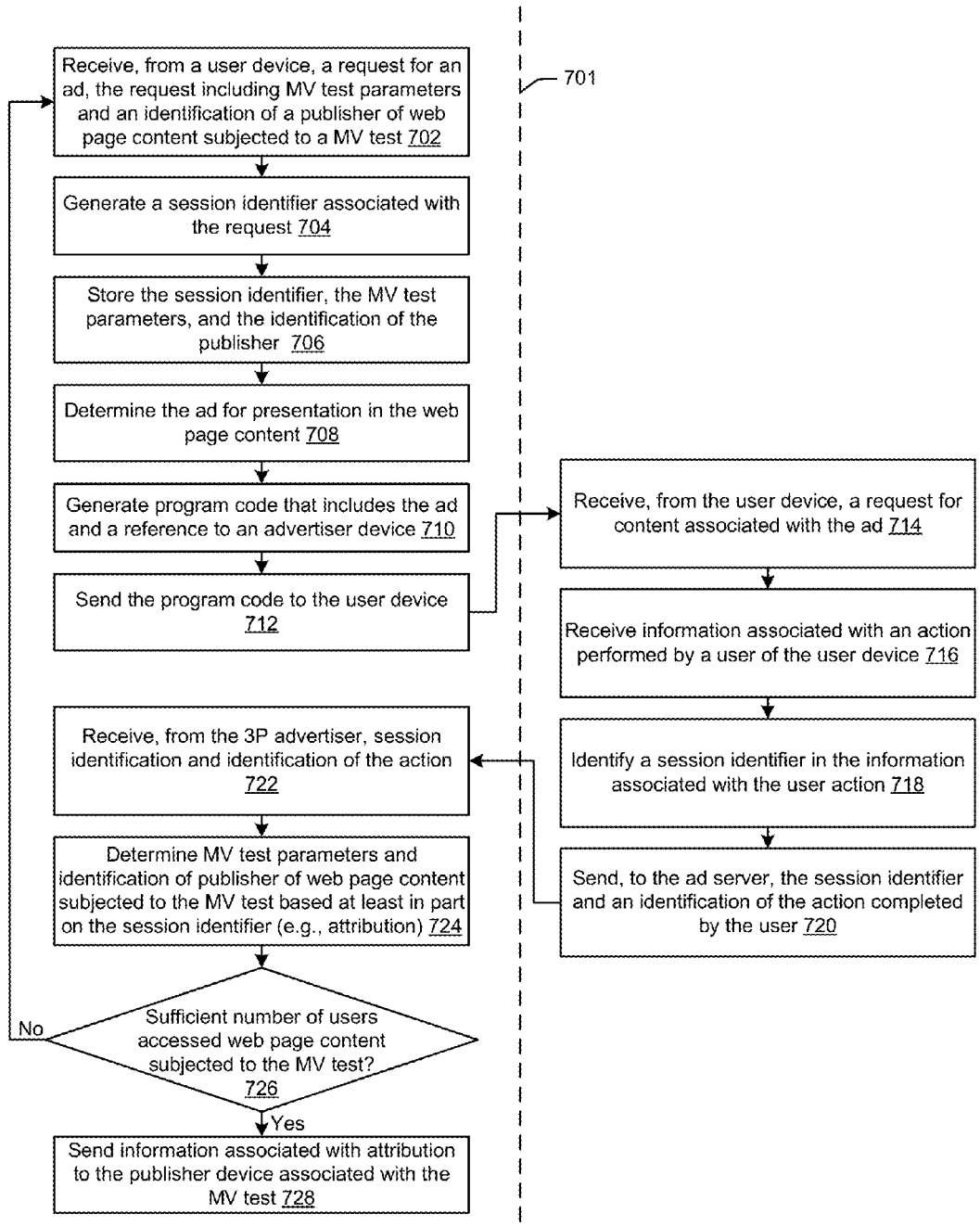
FIG. 7 illustrates a flow diagram of an example process in which an ad server attributes a user's actions to multivariate test parameters, according to an embodiment of the disclosure.

FIG. 7 depicts a flow diagram of an example process in which an ad server attributes a user's actions to multivariate test parameters, according to an embodiment of the disclosure. According to one configuration, the example process may be performed by an ad server (for example, the ad server 210 in FIG. 2) and an advertiser device (for example, the advertiser device 240 in FIG. 2), which may be associated with a third party advertiser in the present example.

Processes associated with the ad server are shown to the left of the dotted line 701 while processes associated with the advertiser device are shown to the right of the dotted line 701.

The example process may begin at block 702, where a request for an ad may be received from a user device (for example, the user device 280 in FIG. 2). The request may include multivariate test parameters and an identifier of a publisher of web page content subject of the multivariate test, among other information. A unique session identifier associated with the request may be generated at block 704. The unique session identifier may be stored in association with the multivariate test parameters and the identification of the publisher at block 706. Such information may be stored in a cookie at the user device and/or a data store, in example embodiments. An ad may be determined for presentation in the web page content at block 708. At block 710, program code that includes the ad and a reference to an advertiser (for example, a third party advertiser) may be generated. The program code may be sent to the user device at block 712.

A request for content associated with the ad may be received by the advertiser device (e.g., via the advertiser communication module 254) at block 714. Information associated with an action performed by a user of the user device (for example, completing a form to enroll in a program) may be received at block 716. A session identifier associated with the user action may be identified (for example, in a cookie at the user device) at block 718, and the session identifier and an identification of the action completed by the user, among other information, may be sent at block 720.

The ad server, upon receiving the session identifier and the identification of the action, at block 722, may determine the multivariate test parameters and the identification of the publisher of the web page content subject of the multivariate test based at least in part on the session identifier associated with the user's action, at block 724. In this way, the user's action (for example, completing a form to enroll in a program) may be attributed to the multivariate test parameters and publisher identification associated with the web page content subject to a multivariate test. If a sufficient number of users have accessed the web page content subject of the multivariate test at block 726, as described above, then information associated with the attribution of the user's enrollment (or other action) to the multivariate test parameters and publisher identification may be sent from the ad server to the publisher device, at block 726. If a sufficient number of users has not accessed the web page content, then processing may return to block 702.

Figure 8:
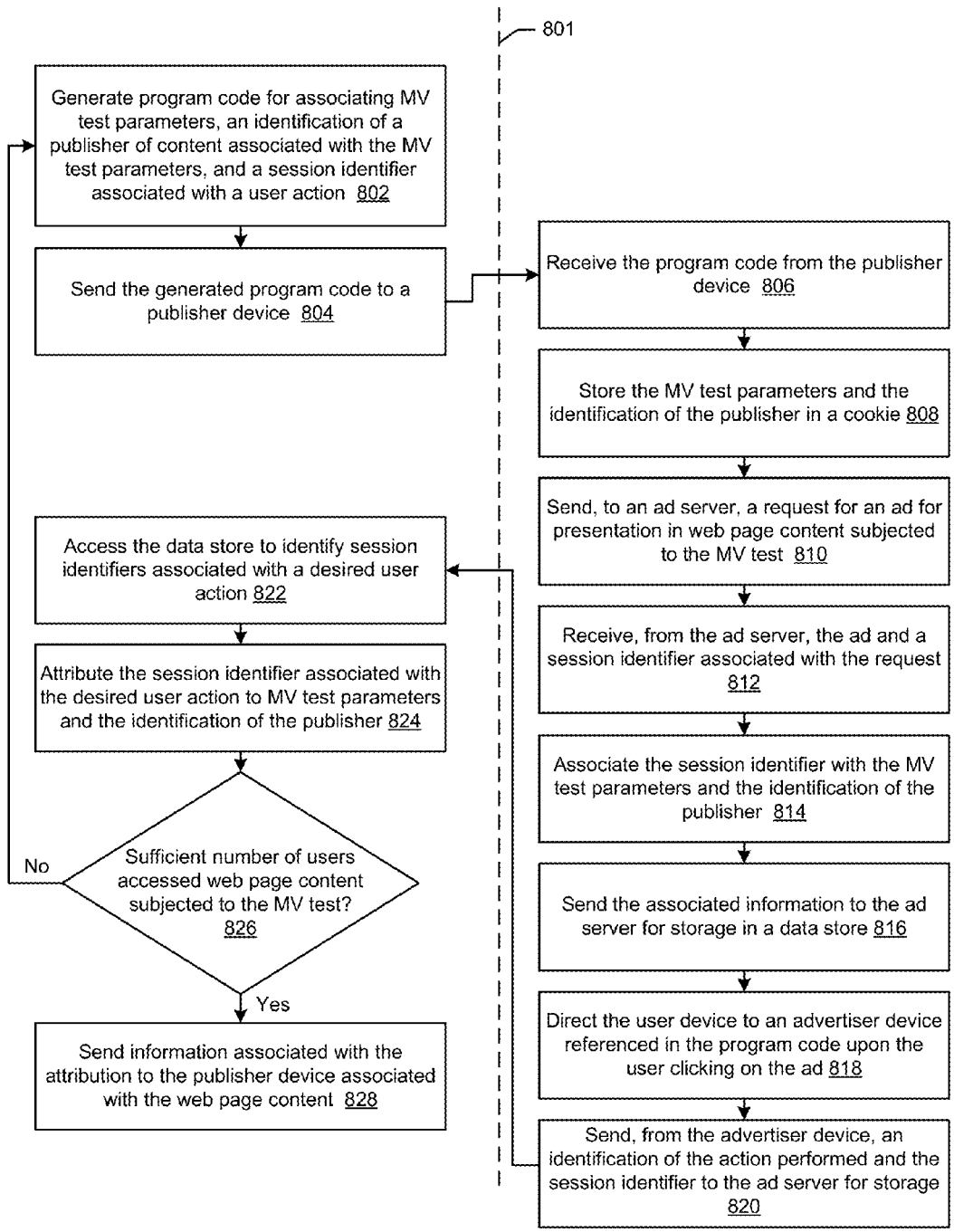
FIG. 8 illustrates a flow diagram of an example process for attributing a user's web-based actions to multivariate testing of web page content in which a configuration server associated with an ad server performs the attribution, according to an embodiment of the disclosure.

FIG. 8 depicts a flow diagram of an example process for attributing a user's web-based actions to multivariate testing of web page content in which a configuration server associated with an ad server performs the attribution, according to an embodiment of the disclosure. According to one configuration, the example process may be performed by a configuration server (for example, the configuration server 560 in FIG. 5) and a user device (for example, the user device 280 in FIG. 2). Processes associated with the configuration server are shown to the left of the dotted line 801 while processes associated with the user device are shown to the right of the dotted line 801.

The example process may begin at block 802, where program code may be generated. The program code may associate multivariate test parameters, an identification of a publisher of web page content subject to a multivariate test, and a session identifier associated with a user action. The generated program code may be sent to a publisher device associated with the publisher at block 804.

The user device may receive the program code from the publisher device, including the multivariate test parameters and the identification of the publisher (at block 806) and may store the multivariate test parameters and the identification of the publisher in a cookie associated with the user device (for example, via the browser or dedicated user application 286 in FIG. 2), at block 808. The program code may cause the user device to send a request to an ad server for an ad for presentation in the web page content at block 810, in one embodiment. The user device may receive the requested ad and a session identifier associated with the request at block 812. The user device (for example, via the user attribution module 288) may associate such a session identifier with the multivariate test parameters and the identification of the publisher at block 814. In one embodiment, such information may be stored in a cookie associated with the user device, or may be stored in another data store in other embodiments. The user device may send the associated information to the ad server for storage in a data store at block 816, according to one embodiment.

Upon the user selecting the ad, the user device may be directed to an advertiser device or other destination device identified in the generated program code, at block 818. At block 820, after a user completes an action desired by the advertiser device, such as a user action described above, the advertiser device may send an identification of the action and the session identifier (for example, as stored in a cookie associated with the user device) to the ad server, which may store the identification of the action and the session identifier in a data store, in one embodiment. In another embodiment, the advertiser device may store such information in the data store. The session identifier may be stored in the data store in association with an identification of the user's action, among other information. The configuration server may identify each session identifier stored in association with a user action and, for each identified session identifier, determine multivariate test parameters and an identification of the publisher as stored in the data store, at block 822. A match on a session identifier associated with the multivariate test parameters and a session identifier associated with a user action may enable the session identifier associated with the user's action to be attributed to the relevant multivariate test parameters and publisher identification, at block 824, according to one embodiment.

If a sufficient number of users have accessed the web page content subject of the multivariate test at block 826, as described above, then information associated with the attribution of the user's action to the multivariate test parameters and publisher identification may be sent to the publisher device, at block 828. If a sufficient number of users have not accessed the web page content, then processing may return to block 802, in one embodiment.

The operations and processes described and shown above may be carried out or performed in any suitable order as desired in various implementations. Additionally, in certain implementations, at least a portion of the operations may be carried out in parallel. Furthermore, in certain implementations, less than or more than the operations described above may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. One or more non-transitory computer-readable media storing computer-executable instructions that, when executed by at least one processor, configure the at least one processor to perform operations comprising:
   receiving, from a user device, a request for an ad for presentation in web page content, wherein the request comprises multivariate test parameters associated with the web page content and an identification of a publisher of the web page content associated with a publisher device;
   storing the multivariate test parameters and the identification of the publisher in association with a first session identifier;
   receiving information associated with an action performed by a user at an advertiser device, wherein the action comprises at least one of purchasing a product or service associated with the ad, enrolling into a program, or completing a survey, the information comprising a second session identifier;
   attributing the second session identifier associated with the action performed by the user to the multivariate test parameters and the identification of the publisher by:
      determining the second session identifier is the same as the first session identifier; and
      determining that the multivariate test parameters and the identification of the publisher are associated with the second session identifier;
   determining, based at least in part on a number of possible variations of the multivariate test parameters, that a statistically sufficient number of users have accessed the web page content; and
   sending information associated with the action performed by the user and the multivariate test parameters to the publisher device after the web page content has been accessed by the statistically sufficient number of users.

2. The one or more non-transitory computer-readable media of claim 1, the at least one processor further configured to perform the operations comprising:
   generating the first session identifier in response to receiving the request for the ad; and
   sending at least the first session identifier to the user device.

3. The one or more non-transitory computer-readable media of claim 1, wherein the multivariate test parameters, the identification of the publisher, and the first session identifier are stored in at least one of a cookie associated with the user device or a data store.

4. The one or more computer-readable media of claim 1, wherein user identifying information a respective identity of the users is not sent to the publisher device.

5. The one or more non-transitory computer-readable media of claim 1, wherein the action comprises a purchase of a product or service associated with the ad, and wherein the information associated with the multivariate test parameters comprises a transaction parameter corresponding to the multivariate test parameters.

6. The one or more non-transitory computer-readable media of claim 1, the at least one processor further configured to determine the ad based at least in part on at least one of information associated with the user, the user device, or the web page content.

7. The one or more non-transitory computer-readable media of claim 1, the at least one processor further configured to perform the operations comprising:
  requesting the ad; and
  sending at least the first session identifier to the publisher device.

8. The one or more non-transitory computer-readable media of claim 1, wherein the attribution is performed according to a schedule.

9. The one or more non-transitory computer-readable media of claim 1, wherein the multivariate test parameters comprise a plurality of positions of an ad in the web page content.

10. A method comprising:
  receiving, from a user device, a request for an ad for presentation in web page content, wherein the request comprises multivariate test parameters associated with the web page content and an identification of a publisher of the web page content associated with a publisher device;
  storing the multivariate test parameters and the identification of the publisher in association with a first session identifier;
  receiving information associated with an action performed by a user at an advertiser device, wherein the action comprises at least one of purchasing a product or service associated with the ad, enrolling into a program, or completing a survey, the information comprising a second session identifier;
  attributing the second session identifier associated with the action performed by the user to the multivariate test parameters and the identification of the publisher by:
    determining the second session identifier is the same as the first session identifier; and;
    determining that the multivariate test parameters and the identification of the publisher are associated with the second session identifier;
  determining, based at least in part on a number of possible variations of the multivariate test parameters, that a statistically sufficient number of users have accessed the web page content; and
  sending information associated with the action performed by the user and the multivariate test parameters to the publisher device after the web page content has been accessed by the statistically sufficient number of users.

11. The method of claim 10, further comprising:
  generating the first session identifier in response to receiving the request for the ad; and
  sending at least the first session identifier to the user device.

12. The method of claim 10, wherein the multivariate test parameters, the identification of the publisher, and the first session identifier are stored in at least one of a cookie associated with the user device or a data store.

13. The method of claim 10, wherein user identifying information is not sent to the publisher device.

14. The method of claim 10, wherein the information associated with the multivariate test parameters comprises a transaction parameter corresponding to the multivariate test parameters.

15. The method of claim 10, further comprising determining the ad based at least in part on at least one of information associated with the user, the user device, or the web page content.

16. A system comprising:
  at least one memory that stores computer-executable instructions; and
  at least one processor configured to access the at least one memory, wherein the at least one processor is configured to execute the computer-executable instructions to:
    receive, from a user device, a request for an ad for presentation in web page content, wherein the request comprises multivariate test parameters and an identification of a publisher of the web page content associated with a publisher device;
    generate a first session identifier in response to receiving the request for the ad;
    generate the ad, the identification of the publisher, and an identification of the advertiser device;
    send at least the first session identifier to the user device;
    store the multivariate test parameters and the identification of the publisher in association with the first session identifier;
    receive information associated with an action performed by a user at an advertiser device, wherein the action comprises at least one of purchasing a product or service associated with the ad, enrolling into a program, or completing a survey, the information comprising a second session identifier;
    attribute the second session identifier associated with the action performed by the user to the multivariate test parameters and the identification of the publisher by:
      determining the second session identifier is the same as the first session identifier; and
      determining that the multivariate test parameters and the identification of the publisher are associated with the second session identifier;
    determine, based at least in part on a number of possible variations of the multivariate test parameters, that a statistically sufficient number of users have accessed the web page content; and
    send information associated with the action performed by the user and the multivariate test parameters to the publisher device after the web page content has been accessed by the statistically sufficient number of users.

17. The system of claim 16, wherein the multivariate test parameters, the identification of the publisher, and the first session identifier are stored in at least one of a cookie associated with the user device or a data store.

* * * * *